United States Patent

Neko et al.

Patent Number: 5,259,748
Date of Patent: Nov. 9, 1993

[54] ARTICLE CONFORMITY DISCRIMINATING APPARATUS FOR AN INJECTION-MOLDING MACHINE

[75] Inventors: Noriaki Neko; Masao Kamiguchi; Minoru Kobayashi, all of Yamanashi, Japan

[73] Assignee: Fanuc Ltd., Minamitsuru, Japan

[21] Appl. No.: 935,457

[22] Filed: Aug. 26, 1992

Related U.S. Application Data

[63] Continuation of Ser. No. 613,744, filed as PCT/JP90/00396, Mar. 26, 1990, published as WO 90/11174, Oct. 4, 1990, abandoned.

[30] Foreign Application Priority Data

Mar. 28, 1989 [JP] Japan ................................ 1-74054

[51] Int. Cl.$^5$ ............................................. B29C 45/77
[52] U.S. Cl. .................................. 425/145; 264/40.3; 264/40.7; 425/149
[58] Field of Search ..................... 425/140, 145, 149; 264/40.3, 40.7

[56] References Cited

U.S. PATENT DOCUMENTS 4,970,447  11/1990  Kamiguchi et al. ................ 425/149
5,017,315   5/1991  Kumazaki ........................... 425/149

*Primary Examiner*—Tim Heitbrink
*Attorney, Agent, or Firm*—Staas & Halsey

[57] ABSTRACT

An article conformity discriminating apparatus for an injection molding machine is capable of automatically discriminating the conformity of articles with accuracy without using a conforming article sample. In molding cycles for mass production of articles executed according to optimum molding conditions of a mold file read from a shared memory (105), an actual resin pressure detected by a pressure sensor (4) is periodically sampled according to an output of an address generator (118), while a reference resin pressure sampled in the same sampling period or a corresponding sampling period on a pressure transition pattern, in a conforming article molding process for determining the optimum molding conditions made before the mass production of the articles, is read from the shared memory, (105) by a processor (114), and the actual resin pressure is compared with the reference resin pressure. If the absolute value of the difference between the values falls outside an allowable range, a defective sample counter value is incremented. When a hold process ends, a conforming article signal is sent if the counter value indicating the frequency of improper actual resin pressure generation is not greater than an allowable frequency, whereas a defective article signal is sent if the counter value exceeds the allowable frequency.

6 Claims, 5 Drawing Sheets

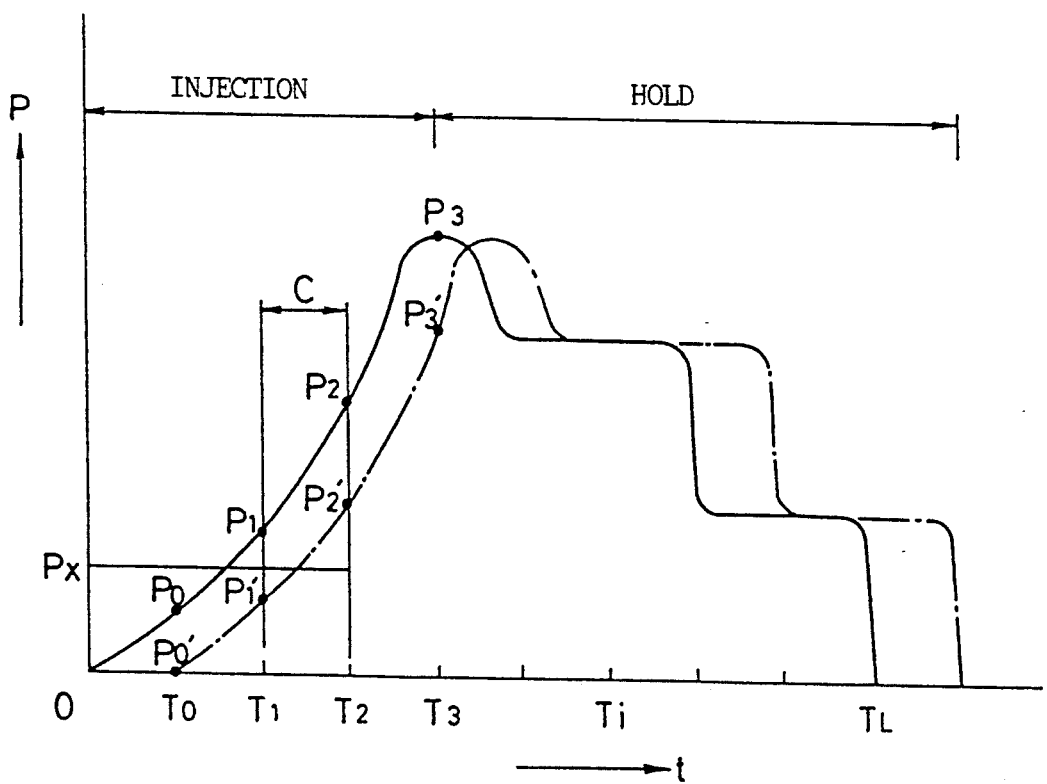

ARTICLE CONFORMITY DISCRIMINATING APPARATUS FOR AN INJECTION-MOLDING MACHINE

This application is a continuation of application Ser. No. 07/613,744, filed as PCT/JP90/00396, Mar. 26, 1990, published as WO 90/11174, Oct. 4, 1990, now abandoned.

BACKGROUND OF THE INVENTION

1. Field of the Invention

The present invention relates to an article conformity discriminating apparatus for an injection molding machine, and more particularly, to an apparatus capable of automatically discriminating the conformity of articles with accuracy.

2. Description of the Related Art

Conventionally, the conformity of articles massproduced by means of an injection molding machine is discriminated by using a conforming article sample. To attain this, a sample is previously saved which has been manufactured in a molding process for deciding optimum injection molding conditions and judged to be conforming by inspection, before mass production. A required number of articles are extracted from each lot of mass-produced articles, and these extracted samples are compared, mainly visually, with the conforming article sample, whereby the conformity of the articles of each lot is discriminated.

According to the conventional method described above, the conforming article sample must be saved for each type of article (mold). As the types of articles (molds) increase in number, therefore, the number of conforming articles to be saved increases, so that it becomes difficult to secure sufficient storage space. Since the article conformity discrimination is based mainly on visual inspection, moreover, it sometimes lacks in reliability. If the conforming article samples are saved for a long time, such samples may possibly suffer changes on standing. In such a case, the reliability of the article conformity discrimination based on the conforming article samples is lowered.

SUMMARY OF THE INVENTION

The object of the present invention is to provide an article conformity discriminating apparatus for an injection molding machine, capable of automatically discriminating the conformity of articles with accuracy without using a conforming article sample.

In order to achieve the above object, an article conformity discriminating apparatus according to the present invention comprises: means for periodically sampling a resin pressure; means for storing the resin pressures, sampled beforehand by the sampling means when a conforming article is molded, as reference resin pressures; and discrimination means for discriminating conformity of an article by comparing each actual resin pressure sampled by the sampling means during the execution of an actual molding cycle with the reference resin pressure corresponding thereto.

According to the present invention, as described above, the resin pressures, previously sampled by means of the sampling means when the conforming article is molded, is stored as the reference resin pressures, and the conformity of the articles is discriminated by comparing each actual resin pressure sampled by means of the sampling means during the execution of the actual molding cycle with the reference resin pressure corresponding thereto, by means of the discrimination means, so that the article conformity can be automatically discriminated. Thus, conforming article samples are unnecessary, so that the problem of the security of a sample storage space or the like, encountered when the conforming article samples are used, can be eliminated. Further, this method is higher in reliability than an operator's visual inspection.

BRIEF DESCRIPTION OF THE DRAWINGS

FIG. 5 is a diagram showing a pressure data table used for the article conformity discrimination process;

FIG. 6 is a diagram showing a mold file used for the article conformity discrimination process;

FIG. 8 is a graph showing changes of an actual resin pressure and a reference resin pressure with the passage of time, in a molding cycle according to the second embodiment.

DESCRIPTION OF THE PREFERRED EMBODIMENT

Figure 1:
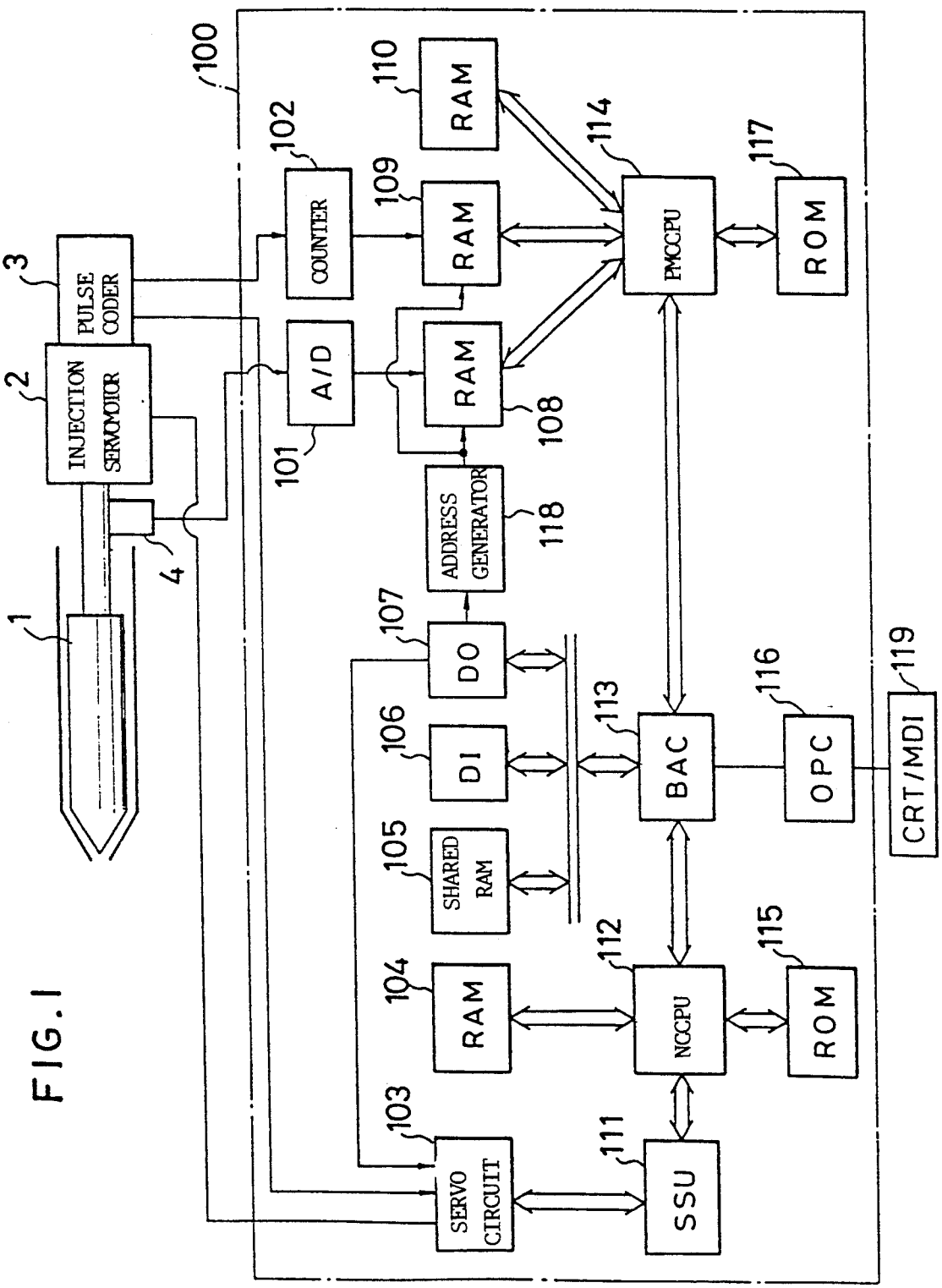
FIG. 1 is a block diagram showing the principal part of an injection molding machine furnished with an article conformity discriminating apparatus according to a first embodiment of the present invention.

An electrically-operated injection molding machine furnished with an article conformity discriminating apparatus according to a first embodiment of the present invention comprises various units, such as an injection unit, a mold clamping unit, an article ejecting unit (ejector), etc. Referring to FIG. 1, the injection unit includes a screw 1, an injection servomotor 2 for axially driving the screw 1, and a servomotor (not shown) for rotating the screw 1. The injection servomotor 2 is fitted with a pulse coder 3 for detecting the rotational motor position (moved position with respect to the axial direction of the screw), and the screw 1 is fitted with a pressure sensor 4 for detecting a resin pressure (axial reaction from molten resin acting on the screw). Further, the injection molding machine comprises a numerical control device (hereinafter referred to as NC device) 100 for controlling the various units of the injection molding machine in cooperation with a programmable machine controller (not shown).

The NC device 100 includes a numerical control microprocessor (hereinafter referred to as NCCPU) 112 for controlling various servomotors through a servo interface 111 and various servo circuits connected individually to pulse coders (only that pulse coder and that servo circuit which correspond to the injection servomotor 2 are denoted by numerals 3 and 103, respectively). The NCCPU 112 is connected with a random access memory (RAM) 104 used for temporary storage of data or the like and a read-only memory (ROM) 115 stored with a management program for controlling the whole injection molding machine.

Also, the NC device 100 includes a microprocessor (hereinafter referred to as PMCCPU) 114 for the programmable machine controller, and the PMCCPU is connected with a RAM 110 used for temporary storage of data or the like and a ROM 117 stored with a sequence program or the like for controlling sequence operation of the injection molding machine. The PMCCPU 114 contains therein flag memories (not shown) and registers (not shown) for individually storing first flag information F1, second flag information F2, an allowable value e and an allowable frequency N, used for an article conformity discrimination process mentioned later, and contains therein a defective sample counter (not shown) and a processing period counter (not shown) used for the article conformity discrimination process.

A bus arbiter controller (hereinafter referred to as BAC) 113 interposed between the two CPUs 112 and 114 is connected with buses of a shared memory 105, an input circuit 106, and an output circuit 107, so that one of the CPUs 112 and 114 is selectively allowed, under the control of the BAC 113, to access a desired one of the elements 105 to 107 in each operation execution cycle of the CPUs 112 and 114. The shared memory 105, which is formed of a nonvolatile RAM, includes a program storage section for storing an NC program for control of the injection molding machine, etc., and a setting section for storing various set values, parameters and macro variables indicative of molding conditions. More specifically, the setting section of the shared RAM 105 is arranged to store mold files (FIG. 6) each consisting of molding conditions which change in dependence on the type of the mold, and pressure data in injection and hold processes.

The input circuit 106 is connected to various sensors, etc., provided in the various units of the injection molding machine, while the output circuit 107 is connected to the various servo circuits, including the servo circuit 103, and an address generator 118. The address generator 118 is connected to two RAMs 108 and 109 accessible from the PMCCPU 114. The RAM 108 is connected to an A/D converter 101 connected to the pressure sensor 4, so that an A/D converter output (pressure data) indicative of the resin pressure is stored in an address region specified by an output signal from the address generator 118. Further, the RAM 109 is connected to a counter 102 for accumulatively counting feedback pulses from the pulse coder 3, so that a counter output (position data) indicative of the screw position is stored in an address region specified by the address generator output.

A manual data input device (hereinafter referred to as CRT/MDI) 119 with a CRT display unit, which is connected to the BAC 113 through an operator panel controller 116, is provided with software keys, ten-keys, etc., used for the entry of various data and for the display of various setting displays on a CRT screen.

In the following, the operation of the injection molding machine constructed as above will be explained.

Prior to mass-production of articles, optimum molding conditions for each type of the article (mold used) are decided. To this end, when an operator operates the CRT/MDI 119 to input temporary molding conditions depending on the type of the mold (not shown), after mounting the mold to the injection molding machine, these conditions are stored in the setting section of the shared RAM 105. Thereafter, sequence control is performed by the PMCCPU 114, and the drive of the servomotors for the individual axes is controlled by the NCCPU 112, in accordance with the sequence program stored in the ROM 117 and the NC program and the temporary molding conditions stored in the shared RAM 105, whereby one injection molding cycle is executed.

Figure 3:
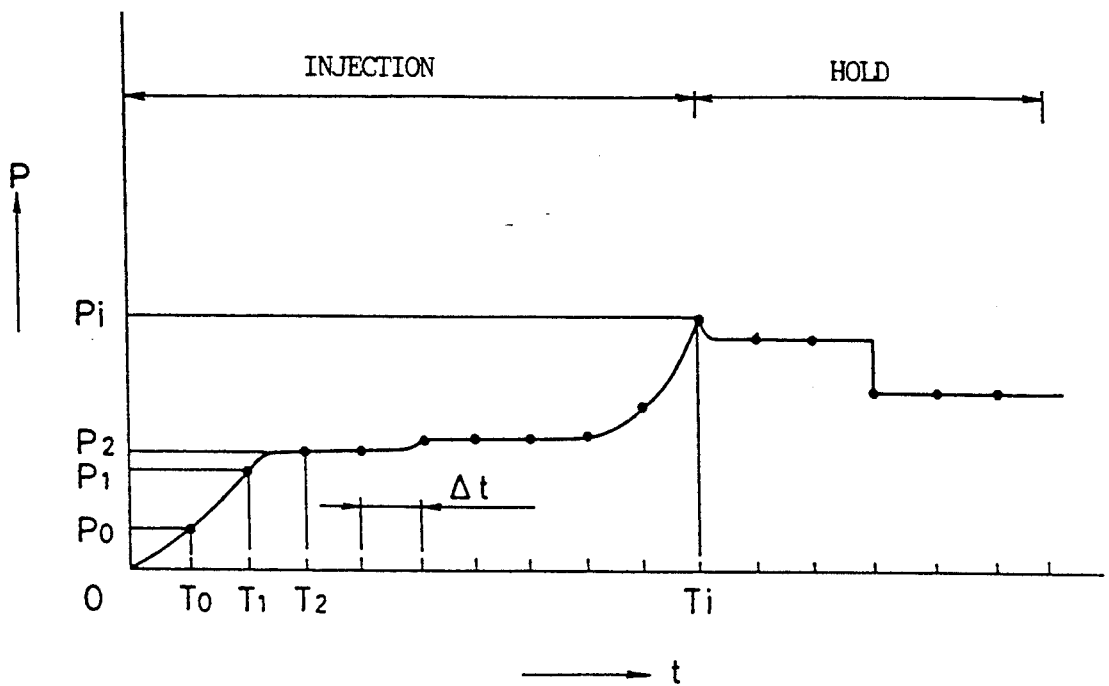
FIG. 3 is a graph showing a resin pressure sampling operation of the article conformity discriminating apparatus of FIG. 1 during a process for molding conforming articles.

During this time, an analog output from the pressure sensor 4, indicative of the resin pressure acting on the screw 1, is converted into a digital signal in the A/D converter 101. As the screw 1 moves, moreover, the feedback pulses delivered from the pulse coder 3 are accumulatively counted by the counter 102. The accumulated value indicates the screw position. When the PMCCPU 114 reads an injection start command from the program, it actuates the address generator 118. Thus, the address generator 118 starts delivering an addressing output to the RAMs 108 and 109 upon start of the injection process. This addressing output is updated at intervals of a sampling period $\Delta t$. As a result, a resin pressure Pi for each sampling period Ti ($i=0, 1, 2, \ldots$) is stored in each corresponding address region of the RAM 108 (FIGS. 3 and 5). Namely, pressure data is tabulated and stored.

When the molding process based on the temporary molding conditions ends, the conformity of the resultant molded article is discriminated by the operator's visual check and a dimensional check using a measuring instrument. Generally, the molded article produced by the molding process based on the temporary molding conditions is subject to various molding defects, such as dimensional defects, warps, sink marks, burrs, etc., so that the operator changes the temporary injection molding conditions depending on the kinds of the molding defects, and then restarts the operation of the injection molding machine. During the execution of this molding process, the resin pressures Pi stored in the RAM 108 during the execution of the preceding molding process are updated for newly sampled values.

Thereafter, the aforesaid molding process is repeated, and if it is concluded that the optimum molding conditions for the stable manufacture of conforming articles are obtained, the operator operates predetermined software keys of the CRT/MDI 119 to cause a mold file display to be displayed on the CRT screen, operates the ten-keys to input a mold number indicative of the type of the mold used in the aforesaid molding process, and further operates a registration key. In response to the operation of the registration key, the optimum molding conditions stored in the shared RAM 105 for the manufacture of conforming articles and the resin pressures Pi of FIG. 3 (pressure data or reference resin pressures of FIG. 6) stored in the RAM 108 for the manufacture of conforming articles are read out, and the mold file (FIG. 6) consisting of the optimum molding conditions and the pressure data for the aforesaid mold is stored in the shared RAM 105.

Thereafter, mold files for various molds are individually prepared as required, following the same procedure as aforesaid, and are stored in the shared RAM 105.

In mass-producing the articles, the operator selects the mold file display, and further specifies the mold number indicative of the mold used. Under the control of the PMCCPU 114 responding to this operation, the optimum molding conditions are read out from the mold file corresponding to the mold number, and are stored in the setting section of the shared RAM 105. In case of discriminating the conformity of articles, the operator operates a conformity discrimination execution key of the CRT/MDI 119. In response to this operation, the PMCCPU 114 sets a first flag F1 to the value "1" which is indicative of the execution of the article conformity discrimination. Further, the operator inputs the allowable value $\epsilon$ and the allowable frequency N, used for the article conformity discrimination process mentioned later, through the CRT/MDI 119. The allowable value a and the allowable frequency N, which are previously experimentally decided, for example, are settled according to the dimensional tolerances of various parts of the articles, which depend on the type of the articles, and the allowable degrees of warps, sink marks, burrs, etc. For precision parts which should be subject to strict criteria for article conformity discrimination, for example, the allowable value a and the allowable frequency N are set individually to small values.

Figure 2:
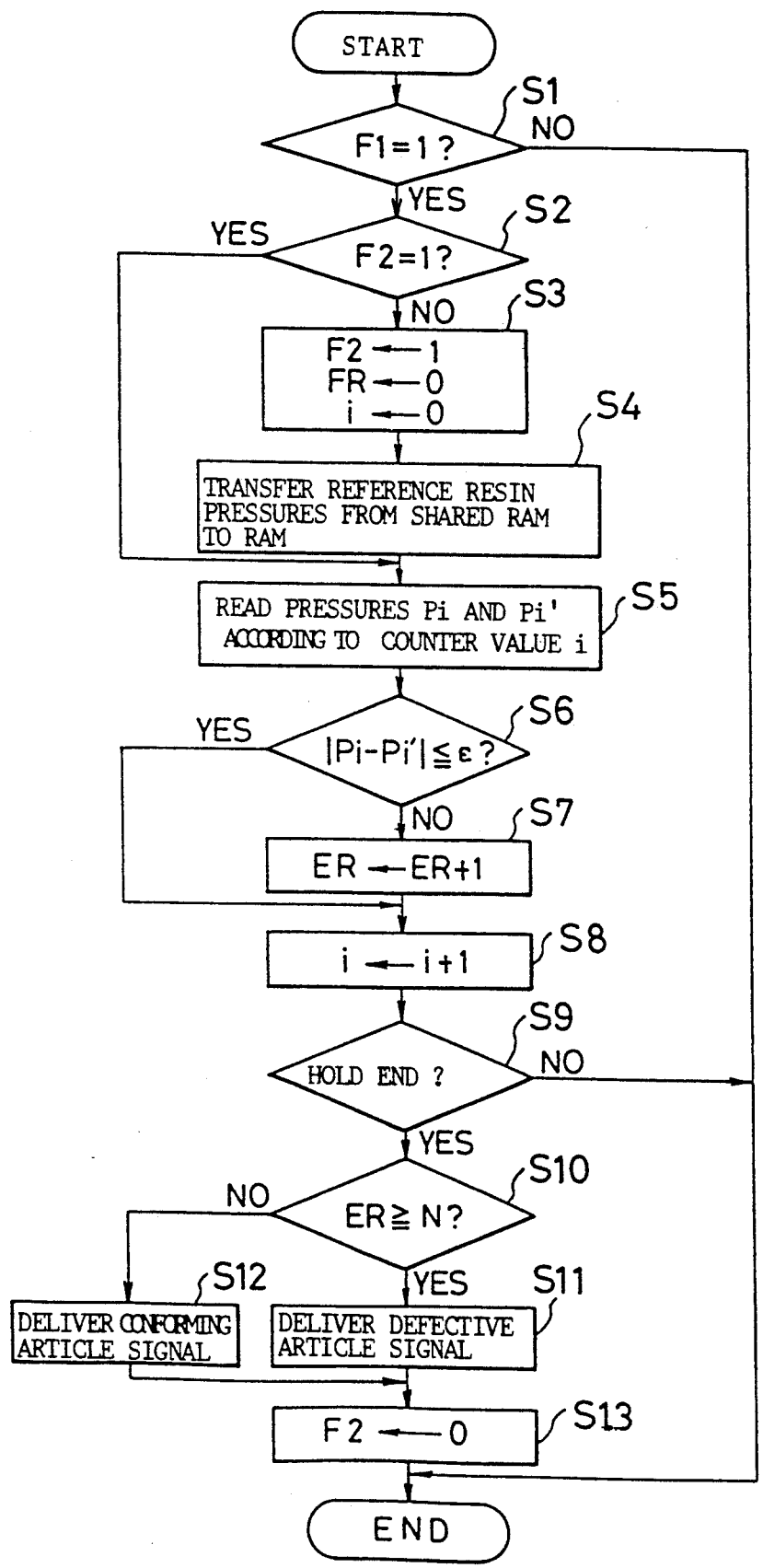
FIG. 2 is a flow chart showing an article conformity discrimination process executed by means of a microprocessor for programmable machine controller shown in FIG. 1.

During the execution of the molding cycle in accordance with the optimum molding conditions, the resin pressure and the screw position are sampled at intervals of the period $\Delta t$, and the article conformity discrimination process shown in FIG. 2 is repeatedly executed in synchronism with this sampling operation by means of the PMCCPU 114.

Namely, in each processing period, the PMCCPU 114 determines whether or not the first flag F1 is set to "1" (step S1). If the first flag F1 is set, the PMCCPU 114 further determines whether or not the second flag F2 is set to the value "1" which is indicative of the continuation of the article conformity discrimination (step S2). The determination result at step S2 in a processing period T0 immediately after the start of the injection process is negative. In this case, the PMCCPU 114 sets the second flag F2 to the value of "1" in order to start the conformity discrimination for the article manufactured in the present molding cycle, and resets a value ER in the defective sample counter and a value i in the processing period counter to "0", respectively (step S3). Then, the PMCCPU 114 causes the RAM 110 to store the reference resin pressures Pi (i=0, 1, 2, ...) read out from the mold file which corresponds to the mold number specified beforehand prior to the start of the molding process (step S4).

Figure 4:
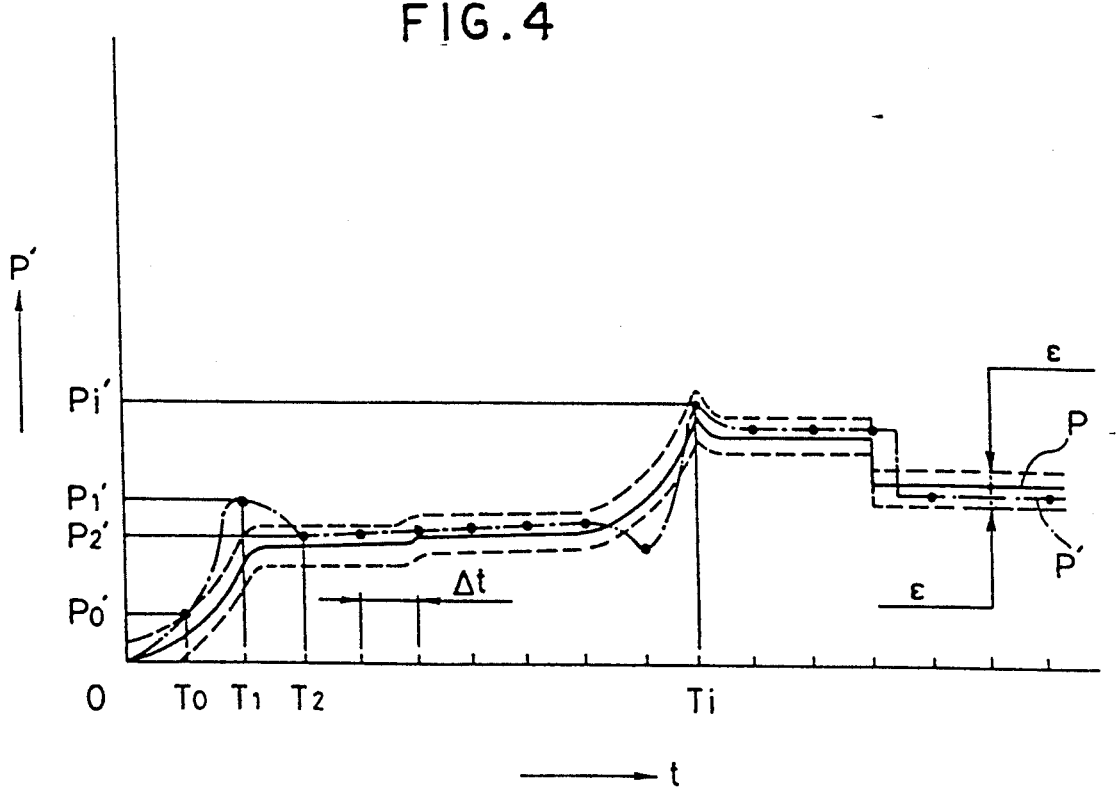
FIG. 4 is a graph showing a resin pressure sampling operation in a molding cycle and an allowable value used for the article conformity discrimination process.

Next, the PMCCPU 114 reads out the reference resin pressure Pi (represented by solid line in FIG. 4) specified by the present counter value i from the RAM 110, also reads out a sampled actual resin pressure Pi' (represented by chain line in FIG. 4) from the RAM 108 (step S5), and determines whether or not the absolute value |Pi−Pi'| of the difference between these two values is equal to or smaller than the allowable value $\epsilon$ (step S6). If the absolute value is equal to or smaller than the allowable value $\epsilon$, and therefore, if the actual resin pressure Pi' falls within the allowable range defined by broken lines in FIG. 4, it is concluded that the actual resin pressure Pi' is normal, and step S8, mentioned later, is entered. If the absolute value is greater than the allowable value $\epsilon$, on the other hand, it is concluded that the actual resin pressure is improper, and the value ER in the defective sample counter is updated to a value of "ER+1" (step S7). Subsequently, the PMCCPU 114 updates the value i in the processing period counter to a value "i+1", at step S8, and then determines whether or not a hold end command is read out from the program (step S9). If the hold process is not finished, the article conformity discrimination process of FIG. 2 for the present processing period is terminated.

In the processing period Ti (i=0, 1, 2, ...) other than the processing period T0 immediately after the start of the injection process, the PMCCPU 114 determines whether or not the first flag F1 is reset to the value "0" in response to the operator's operation to release the conformity discrimination execution key (step S1). If the flag F1 is not reset, step S2 is entered. Since the decision at step S2 is affirmative, the corresponding ones of steps S5 to S9 mentioned before are executed in succession.

At step S9 in a later processing period, if it is concluded that the hold process is finished, the PMCCPU 114 determines whether or not the value ER in the defective sample counter, which is indicative of the number of times the actual resin pressure Pi' (i=0, 1, 2, ...) is found to be improper during the time period between the start of the injection process and the end of the hold process, is equal to or smaller than the allowable frequency N, which is indicative of the maximum frequency of generation of the improper actual resin pressure Pi' which entails no molding defect (step S10).

If the counter value ER is greater than the allowable frequency N, a defective article signal is delivered (step S11), and if the counter value ER is equal to or smaller than the allowable frequency N, on the other hand, a conforming article signal is delivered (step S12). In response to the defective article signal or the conforming article signal, the result of the article conformity discrimination is displayed on the CRT screen. Then, the PMCCPU 114 resets the second flag F2 to the value "0" which is indicative of the end of the conformity discrimination process (step S13), whereupon the conformity discrimination process of FIG. 2 for the article manufactured in the present molding cycle ends.

The conformity discrimination process of FIG. 2 is also executed in like manner for the next molding cycle.

In the following, an injection molding machine provided with an article conformity discriminating apparatus according to a second embodiment of the present invention will be explained.

As compared with the apparatus of the first embodiment which discriminates the conformity of the articles by comparing each actual resin pressure sampled during the execution of the actual molding process for mass production with the corresponding resin pressure (reference resin pressure) sampled during the execution of the conforming article molding process for the decision of the optimum conditions, i.e., by comparing the actual resin pressure and the reference resin pressure sampled during the same sampling period, the apparatus of the second embodiment differs therefrom in that it performs the article conformity discrimination in a more appropriate manner by comparing the respective time-based transition patterns of the actual resin pressure and the reference resin pressure. By comparing the pressure transition patterns in this manner, the deviation in injection start timing and the difference in the manner of rise of the resin pressure, between the actual molding process and the conforming article molding process, can be compensated.

Basically, the apparatus of the second embodiment is constructed in the same manner as the apparatus of the first embodiment (FIG. 1). The apparatus of the present embodiment, however, is arranged to determine whether or not a predetermined pressure Px (FIG. 8) is attained by each of the reference resin pressures read out successively in the article conformity discrimination process, in order to compare the pressure transition patterns with each other. To this end, the PMCCPU 114 contains therein a register for storing the predetermined pressure Px previously set by the operator prior to the start of the actual molding process. Further, the PMCCPU is provided with a register group (mentioned later) used for the article conformity discrimination process. Unlike the apparatus of the first embodiment in which the reference resin pressures are stored in the RAM 110 during the execution of the article conformity discrimination process (step S4 of FIG. 2), moreover, the apparatus of the present embodiment is so designed as to store the reference resin pressures in the RAM 110 immediately when the mold number is specified at the start of the actual molding process for mass production.

Figure 7:
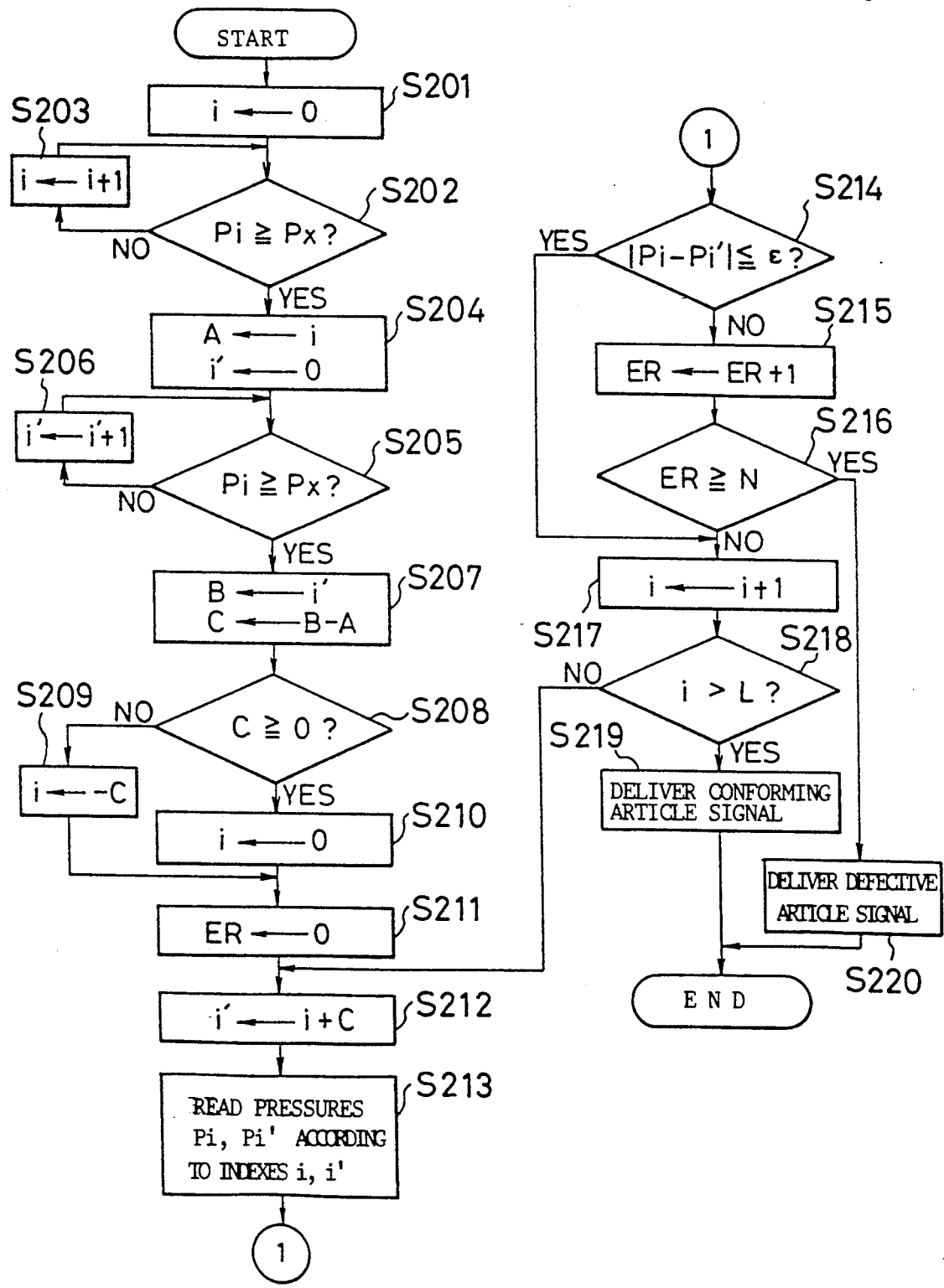
FIG. 7 is a flow chart showing an article conformity discrimination process executed by means of an apparatus according to a second embodiment of the present invention.

Referring now to FIGS. 7 and 8, the operation of the article conformity discriminating apparatus according to the second embodiment will be described.

When a metering start command is read from the program after the completion of the injection and hold processes, during the execution of the actual molding process, the PMCCPU 114 sets the value of the index (value in the processing period counter) i to "0" (step S201). Then, in accordance with the index i (=0), a determination is made as to whether or not a zeroth reference resin pressure PO (generally, ith reference resin pressure Pi) read out from the RAM 110 is equal to or higher than the predetermined pressure Px (step S202). If the decision is negative, the index i is updated to the value "i+1" (step S203), and, at step S202, the reference resin pressure Pi corresponding to the updated index i is compared with the predetermined pressure Px. If the decision at step S202 is affirmative, the PMCCPU 114 causes a register A to store the index i at that time, i.e., the index 1 indicative of the sampling period Ti during which the resin pressure equal to or higher than the predetermined pressure Px is detected for the first time in the conforming article molding process, and resets a second index i' to the value "0" (step S204). In the example shown in FIG. 8, the reference resin pressure Pi represented by solid line attains the predetermined pressure Px during a first period T1, so that the value "1" is stored in the register A.

In accordance with the second index i', the PMCCPU 114 then reads out the actual resin pressure Pi' detected during an i'th period Ti' for the actual injection and hold processes from the corresponding address region of the RAM 108, and determines whether or not the pressure Pi' is equal to or higher than the predetermined pressure Px (step S205). If the decision in this step is negative, the index i' is updated to a value "i'+1" (step S206), and, at step S205, the reference resin pressure Pi' corresponding to the updated index i' is compared with the predetermined pressure Px. If the decision at step S205 is affirmative, the PMCCPU 114 causes a register B to store the second index i' at that time, i.e., the index i' indicative of the sampling period Ti during which the resin pressure equal to or higher than the predetermined pressure Px is detected for the first time in the actual molding process. Also, the PMCCPU causes a register C to store a value obtained by subtracting the stored value i in the register A from the stored value i' in the register B, that is, a value "i'−i" which is indicative of the deviation in that point of time at which the resin pressure equal to or higher than the predetermined pressure Px is sampled for the first time, between the conforming article molding process and the actual molding process (step S207). In the example shown in FIG. 8, the actual resin pressure Pi' represented by chain line attains the predetermined pressure Px during a second period T2, so that the value "1" is stored in the register C.

Further, the PMCCPU 114 determines whether or not the stored value in the register C is "0" or positive (step S208). If the decision is affirmative, that is, if it is concluded that the point of time when the resin pressure not less than the predetermined pressure Px is sampled for the first time in the actual molding process is behind its corresponding point of time in the conforming article molding process, as in the case of FIG. 8, the PMCCPU 114 sets the index i, employed to address the RAM 110 in association with step S213 for reference resin pressure readout (mentioned later), to the value "0" (step S210). If it is concluded at step S208, on the other hand, that the stored value in the register C is negative, that is, the resin pressure not less than the predetermined pressure Px is sampled earlier in the actual molding process than in the conforming article molding process, the address index i is set to a value of the opposite sign (>0) equal in absolute value to the value stored in the register C (step S209).

Subsequently, the PMCCPU 114 sets the second index i', employed to address the RAM 108 in association with the actual resin pressure readout in step S213 (mentioned later), to a value equal to the sum of the index i and the value stored in the register C (step S212). More specifically, if the stored value in the register C is "0" or positive, the index i is set to "0" at step S210, so that the second index i' is set to a value equal to the stored value in the register C (index i' is set to "1" in the case of FIG. 8). If the stored value in the register C is negative, on the other hand, the index i is set to a value of the opposite sign equal in absolute value to the stored value in the register C at step S210, so that the second index i' is set to "0."

Then, the PMCCPU 114 successively executes steps S213 to S215 which correspond individually to steps S5 to S7 of FIG. 2 associated with the first embodiment. As a result, each of the actual resin pressures Pi' sampled in respective sampling periods is compared with the reference resin pressure Pi sampled in a corresponding period on the pressure transition pattern even when the injection start timing varies between the actual molding process and the conforming article molding process, in contrast with the case of the first embodiment in which each actual resin pressure Pi' is compared with the reference resin pressure Pi sampled in the same sampling period. Consequently, the deviation in injection start timing and hence the difference in the manner of rise of the resin pressure are compensated, and the propriety of the actual resin pressure is properly discriminated.

If it is then concluded at step S214 that the absolute value |Pi−Pi'| of the difference between the reference resin pressure and the actual resin pressure is not greater than the allowable value $\epsilon$, that is, the actual resin pressure is proper, step S217 (mentioned later) is entered. If it is concluded, on the other hand, that the absolute value of the pressure difference exceeds the allowable value $\epsilon$, that is, the actual resin pressure Pi' is improper, the PMCCPU 114 updates the value ER in the defective sample counter to the value "ER+1, " and then determines whether or not the updated counter value ER is not less than the allowable frequency N, indicative of the maximum frequency of generation of the improper actual resin pressure Pi' which entails no molding defect, at step S216 corresponding to step S10 of FIG. 2.

If the PMCCPU 114 concludes at step S216 that the counter value ER is less than the allowable frequency N, it updates the index i to the value "i+1" at step S217, and then determines whether or not the updated index i is greater than a value L, which is indicative of the final address of the RAM 110 stored with the reference resin pressure in a final sampling period TL (step S218). If the index i' is not greater than the value L, the second index i' is updated at step S212, whereupon step S213 mentioned before and the subsequent steps are executed.

If it is concluded at step S216, thereafter, that the counter value ER exceeds the allowable frequency N, the PMCCPU 114 delivers a defective article signal (step S220). If it is concluded at step S218 that the value L is exceeded by the index i before the allowable frequency N is exceeded by the counter value ER, on the other hand, the PMCCPU 114 delivers a conforming article signal (step S219).

The present invention is not limited to the first and second embodiments described above, and various modifications thereof may be made.

In the aforementioned first embodiment, for example, the result of the article conformity discrimination is displayed on the CRT screen. Alternatively, a defective article may be automatically sorted by driving air nozzles, distributing members, etc. in accordance with memory information, which is indicative of the discrimination result, while the article is being ejected by means of an ejector or transported by means of a conveyor. Further, the operation of the injection molding machine may be stopped, concluding that a conforming article cannot be molded, when a count value of a counter, which is arranged to be resettable in response to supply of a conforming article signal, exceeds a predetermined value, the count value indicating the frequency of continuous generation of defective article signals.

Although the present invention is applied to the electrically-operated injection molding machine in the foregoing two embodiments, the invention may also be applied to a hydraulically-operated injection molding machine. In the embodiments, moreover, the pressure sensor is used to detect the reaction force of the resin acting on the screw. Alternatively, however, a pressure sensor disposed within the mold may be used.

In the first embodiment, the article conformity is discriminated by comparing the actual resin pressure and the reference resin pressure. If a constant amount of resin is measurable in a metering process preceding the injection process, however, the resin pressure can be expressed as a function of the screw position. Hence, the article conformity can be discriminated by previously sampling the screw position as reference screw position data during the execution of the conforming article molding process by means of the RAM 109 of FIG. 1, and then comparing the actual screw position, sampled during the execution of the actual molding process, with the reference screw position. Alternatively, moreover, screw position transition patterns may be compared with each other on the same principle of operation as the second embodiment in which the resin pressure transition patterns are compared.

In the second embodiment, the indexes i and i', which are indicative of the sampling frequencies before the reference resin pressure Pi and the actual resin pressure Pi' which exceed the predetermined pressure Px are detected for the first time, respectively, are discriminated. Alternatively, a reference resin pressure Pn detected in an n-th sampling period may be used, and a sampling frequency i' until the actual resin pressure Pi' exceeding the reference resin pressure Pn is first detected may be discriminated. In this case, the processes for storing the index i in the register A at steps S201 to 203 and step S204 are unnecessary. In the second embodiment, furthermore, the reference resin pressure Pi or the actual resin pressure Pi' before the attainment of the predetermined pressure Px is compared with that actual resin pressure or reference resin pressure which corresponds thereto on the pressure transition pattern. Alternatively, the reference resin pressure and its corresponding actual resin pressure not less than the predetermined pressure Px may be compared with each other. In this case, the respective initial values of the address indexes i and i' for the resin pressure readout of FIG. 2 are set to those sampling frequencies after which the reference resin pressure and the actual resin pressure exceeding the predetermined pressure are first detected, and the two indexes i and i' are updated to the values "i+1" and "i'+1," respectively, every time the comparison of the two resin pressures is finished.

We claim:

1. An article conformity discriminating apparatus for an injection molding machine, comprising:
    means for periodically sampling a resin pressure to obtain resin pressure values;
    means for storing the resin pressure values, previously periodically samples by said sampling means when a conforming article is molded, as reference resin pressure values; and
    discrimination means for discriminating conformity of an article by comparing each actual resin pressure value periodically sampled by said sampling means during an execution of an actual molding cycle with a corresponding one of the reference resin pressure values which corresponds to each actual resin pressure value on a resin pressure transition pattern.
    said discrimination means determining a first sampling frequency, attained before an actual resin pressure exceeding a predetermined pressure is sampled for a first time, and a second sampling frequency, attained before the reference resin pressure exceeding the predetermined pressure is sampled for the first time, and determining the corresponding one of the resin pressure values corresponding to each actual resin pressure value using said first and second sampling frequencies.

2. An article conformity discriminating apparatus for an injection molding machine according to claim 1, wherein said discrimination means compares each actual resin pressure value with the corresponding one of the reference resin pressure values which are sampled in a substantially identical sampling period.

3. An article conformity discriminating apparatus for an injection molding machine according to claim 1, wherein said discrimination means outputs a signal indicative of a result of discriminating conformity of the article.

4. An article conformity discriminating apparatus for an injection molding machine according to claim 1, wherein said sampling means samples the resin pressure in injection and hold processes.

5. An article conformity discriminating apparatus for an injection molding machine according to claim 2, wherein said sampling means samples the resin pressure in injection and hold processes.

6. An article conformity discriminating apparatus for an injection molding machine according to claim 3, wherein said sampling means samples the resin pressure in injection and hold processes.

* * * * *

UNITED STATES PATENT AND TRADEMARK OFFICE
CERTIFICATE OF CORRECTION

PATENT NO. : 5,259,748
DATED : November 9, 1993
INVENTOR(S) : Noriaki NEKO et al.

It is certified that error appears in the above-indentified patent and that said Letters Patent is hereby corrected as shown below:

Title page, item
[57] ABSTRACT, lines 7, 8, 9, 15 and 16, delete all occurrences of "()";

line 15, after "memory" delete ",".

Column 3, line 13, change "e" to --ϵ--.

Column 5, lines 10 and 18, change "a" to --ϵ--, both occurrences.

Column 7, line 37, change "1" to --i--.

Column 10, line 26, change "samples" to --sampled--;

line 36, change "pattern." to ---pattern,--.

Signed and Sealed this

Nineteenth Day of July, 1994

Attest:

BRUCE LEHMAN

*Attesting Officer*          *Commissioner of Patents and Trademarks*